United States Patent Office 3,022,317
Patented Feb. 20, 1962

3,022,317
3-BENZYL-4-HYDROXYCOUMARIN AND A PROCESS FOR THE PREPARATION OF DERIVATIVES OF 3-BENZYL-4-HYDROXYCOUMARIN
Erich Ziegler, Graz, and Udo Rossmann, Wels, Austria, and Franz Litvan, Basel, Switzerland, assignors to Geigy Chemical Corporation, New York, N.Y., a corporation of Delaware
No Drawing. Filed Jan. 18, 1957, Ser. No. 634,816
Claims priority, application Switzerland Jan. 20, 1956
4 Claims. (Cl. 260—343.2)

The present invention consists in a new process for the production of 3-substituted 4-hydroxycoumarins and the 1-thia analogues thereof which are therapeutically useful as anticoagulants.

In its easy addition to α,β-unsaturated ketones, 4-hydroxycoumarin resembles compounds having a reactive methylene group. However, it is impossible to substitute 4-hydroxycoumarins in the 3-position analogously to acetoacetic acid and malonic acid esters by reacting their alkali metal salts with monohalogen compounds direct or by rearranging the enol ethers first obtained.

It has surprisingly now been found that 4-hydroxycoumarin and its 1-thia analogue react, in the free state in the warm in the presence of hydrogen halide or an inorganic acid halide, with one mol of a benzyl alcohol or, even in the absence of a condensing agent, react with one mol of a halogen hydracid ester of a benzyl alcohol to form 3-substituted 4-hydroxycoumarins and the 1-thia analogues thereof.

The new process for the production of derivatives of 4-hydroxycoumarins of the general formula:

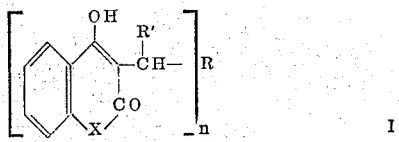

wherein X represents oxygen or sulfur,

R represents a mono- or divalent aromatic hydrocarbon radical which may be substituted, R′ represents hydrogen, an aliphatic hydrocarbon radical or an aromatic hydrocarbon radical which latter may be substituted, and n represents 1 or 2, is characterised by reacting n mol(s) of 4-hydroxycoumarin or its 1-thia analogue of the general formula:

wherein X has the meaning defined above, with one mol of a benzyl alcohol of the general formula:

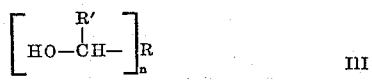

the reaction being performed in the warm and in the presence of hydrogen halide or an inorganic acid halide, or by reacting 4-hydroxycoumarin or its 1-thia analogue of the formula given above with one mol of a halogen hydracid ester of a benzyl alcohol as defined above, chlorine and bromine always being understood by halogen and chlorides and bromides being understood by halides or halogen hydracid esters.

The reaction is performed at temperatures of about 50–150°, mostly between 100 and 150°. The solvent to be used must on the one hand be inert to hydrogen halide and on the other it must be capable of dissolving 4-hydroxycoumarin sufficiently. Also, if the reaction is to be performed under atmospheric pressure, it must have a suitable boiling range. Tetrachlorethane, which fulfills all the above conditions and which can be easily removed with steam, has proved to be the most suitable solvent. Another solvent which can be used is, for example, chlorobenzene. Hydrogen chloride can be used successfully as hydrogen halide and examples of inorganic acid halides are, in particular, phosphorus oxychloride, and also thionyl chloride.

In the reaction of the benzyl alcohols with 4-hydroxycoumarin or its 1-thia analogue, it is probable that the halogen hydracid esters of the former always occur as intermediate products so that the two modifications of the process defined above constitute the same condensation reaction. However, the possibility of using substituted benzyl alcohols as starting materials considerably widens the choice of such substances. On the other hand, in certain cases halogen hydracid esters are more easily accessible, e.g. by chloromethylation of aromatic rings or by halogenation of side chains, than the corresponding alcohols.

Examples of starting materials of the general Formula III are:

Benzyl alcohol, α-phenyl-ethanol, -n-propanol, -n-butanol, benzhydrol, salicyl alcohol, 3.5-dichlorosalicyl alcohol, 4-methoxybenzyl alcohol, 2-hydroxy-3.5-dimethylbenzyl alcohol, 2-hydroxy-3-chloro-5-methylbenzyl alcohol, 2-methoxy-3-chloro-5-methylbenzyl alcohol, α-(2-hydroxy-3-methyl-5-chlorophenyl)-ethanol, α-(2-methoxy-3-methyl-5-chlorophenyl) - n - propanol, 2.6 - bis - hydroxymethyl-4-chlorophenol, 4.6 - bis - hydroxymethyl-o-cresol, 2.6-bis-hydroxymethyl-p-cresol, 2.6-bis-4-tert. butyl phenol, 3.3′-bis-hydroxymethyl-4.4′-dihydroxy-5.5′-dimethyl diphenyl methane, benzyl chloride, benzyl bromide, 2- and 4-chlorobenzyl chloride, p-bromobenzyl bromide and benzhydryl chloride.

The following examples further illustrate the new process. Parts are given as parts by weight and their relationship to parts by volume is as that of grammes to cubic centimetres. The temperatures are in degrees Centigrade.

Example 1

17 parts of 2-hydroxy-3-chloro-5-methyl benzyl alcohol and 20.3 parts of 4-hydroxycoumarin are dissolved or suspended in 120 parts by volume of tetrachlorethane and hydrogen chloride is introduced into this suspension at 50° for a period of 40 minutes. The whole is then heated to 135° until no more hydrogen chloride is developed. After cooling, it is filtered under suction and the 3-(2′-hydroxy-3′-chloro-5′-methyl benzyl)-4-hydroxycoumarin is recrystallised from tetrachlorethane; M.P. 253–254°.

On boiling with acetic acid anhydride, the diacetate is obtained which, after recrystallisation from ethyl acetate, melts at 159°.

The following compounds for example can be produced in an analogous manner:

3 - (α - 3′ - dimethyl - 2′ - hydroxy - 5′ - chlorobenzyl)-4 - hydroxycoumarin, M.P. 239.5° (from tetrachlorethane);

3 - (2′ - hydroxy - 3′.5′ - dichlorobenzyl) - 4 - hydroxycoumarin, M.P. 252–253° (from tetrachlorethane); Diacetate: M.P. 167° (from methanol) and 3 - (2′ - hydroxy - 3′ - methyl - 5′ - chlorobenzyl) - 4-hydroxycoumarin, M.P. 269° (from pyridine).

Example 2

3.78 parts of 2.6-bis-hydroxymethyl-4-chlorophenol and 8.1 parts of 4-hydroxycoumarin are suspended in 120 parts by volume of tetrachlorethane and hydrogen chloride is introduced for half an hour at 50°. The whole is boiled for 15 minutes and then kept for two hours at 140°. After cooling, it is filtered under suction and the residue is washed with ethanol. The product is crystallised from phenylacetate and 2.6-bis-(4'-hydroxycoumarinyl-(3')-methyl)-4-chlorophenol is obtained which melts at 296°.

The following compounds for example can also be obtained in an analogous manner:

2.4 - bis - (4' - hydroxycoumarinyl - (3') - methyl) - 6-methyl phenol, triacetate (by boiling with acetic anhydride), M.P. 226–227° (from tetrachlorethane/ethanol);

2.6 - bis - (4' - hydroxycoumarinyl - (3') - methyl - 4. tert. butyl phenol, M.P. 252–253° (from phenyl acetate);

3.3' - bis - (4'' - hydroxycoumarinyl - (3'') - methyl)-4.4'-dihydroxy-5.5'-dimethyl diphenyl methane, M.P. 264–265° (from nitrobenzene, phenylacetate or tetrachlorethane/ethanol), Tetra-acetate, M.P. 221–223° (from toluene); and 2.6 - bis - (4' - hydroxycoumarinyl - (3') - methyl) - 4-methyl phenol, M.P. 264° (from tetrachlorethane).

*Example 3*

Anhydrous hydrogen chloride is introduced at room temperature into a mixture of 18.4 parts of benzhydrol and 20 parts of calcium chloride in 100 parts by volume of tetrachlorethane until the mixture is saturated. The liquid is then poured off from the sediment, washed with 50 parts by volume of tetrachlorethane, and 18 parts of 4-hydroxy-1-thiacoumarin are added to the united solutions. The suspension obtained is warmed in an oil bath at 130–140° until no more hydrogen chloride is given off and then the tetrachlorethane is removed by steam distillation. The distillation residue is dissolved in caustic soda lye while warming and the clarified solution is acidified. The 3-benzhydryl-4-hydroxy-1-thiacoumarin which precipitates is filtered off. After crystallisation from dioxan/water, it melts at 235–237°.

3 - (α - ethyl - benzyl) - 4 - hydroxy - 1 - thiacoumarin is obtained in an analogous manner, M.P. 145–146° (from ethanol/water).

*Example 4*

13.6 parts of α-phenyl propanol and 20 parts of 4-hydroxy-coumarin in 250 parts by volume of tetrachlorethane are treated with dry hydrogen chloride for one hour at 50° and then warmed on an oil bath at 135–140° until no more hydrogen chloride is developed (about 1½ hours). The reaction mixture is then cooled, unchanged 4-hydroxycoumarin is filtered off under suction and washed with a little tetrachlorethane. After evaporation of the united solutions in the vacuum to dryness and crystallisation from methylcyclohexane, 3-(α-ethyl-benzyl)-4-hydroxycoumarin is obtained, M.P. 176–178°.

*Example 5*

3.5 parts of α-(2-hydroxy-3-methyl-5-chlorophenyl)-n-propanol are dissolved in 35 parts by volume of tetrachlorethane, 3 parts of finely pulverised calcium chloride are added and hydrogen chloride is introduced at 30° for 15 minutes. The calcium chloride is then filtered off, washed with 15 parts by volume of tetrachlorethane and 4.2 parts of 4-hydroxycoumarin are added to the filtrate. The mixture obtained is heated for 40 minutes at 130–140° on an oil bath. After cooling, it is filtered under suction, the residue is washed with ligroin and alcohol and finally 3-(α-ethyl-2'-hydroxy-3'-methyl-5'-chlorobenzyl)-4-hydroxycoumarin is obtained by crystallisation from tetrachlorethane. M.P. 223–224°.

*Example 6*

4 parts of finely pulverised calcium chloride are added to 4.3 parts of α-(2-methoxy-3-methyl-5-chlorophenyl)-propanol in 15 parts by volume of tetrachlorethane and the whole is treated for 30 minutes at 60–70° with hydrogen chloride. The calcium chloride is then removed, 4.8 parts of 4-hydroxycoumarin are added and the whole is heated for one hour at 140–150° and then boiled under reflux for one hour. The solvent is distilled off with steam and the distillation residue is extracted with caustic soda lye. The crystals obtained on neutralising with hydrochloric acid are boiled up twice with water and recrystallised from methanol or ethanol. The 3-(α-ethyl-2'-methoxy - 3' - methyl - 4' - chlorobenzyl) - 4 - hydroxycoumarin obtained melts at 178–179°. 3-(4'-methoxybenzyl)-4-hydroxycoumarin for example can be obtained in an analogous manner. M.P. 185–186° (from methanol).

*Example 7*

1.9 parts of 2-methoxy-3-methyl-5-chlorobenzyl alcohol and 2.4 parts of 4-hydroxycoumarin are pasted in 30 parts by volume of tetrachlorethane, 1 part of phosphorus oxychloride is added and the whole is then heated, first to 100°, then for an hour at 130° and finally for half an hour at the boil. The solvent is then distilled off with steam, the residue is dissolved in 2 N-caustic soda lye, the solution is filtered and acidified. By crystallising from diluted ethanol or methanol, 3-(2'-methoxy-3'-methyl-5'-chlorobenzyl)-4-hydroxycoumarin is obtained, M.P. 166.5°.

*Example 8*

1.5 parts of 2-hydroxy-3.5-dimethyl benzyl alcohol and 1.6 parts of 4-hydroxycoumarin are dissolved in 2 parts of phosphorus oxychloride whereupon heat is generated; the solution is then heated for 10 minutes at 50° and water is added. The reaction product which precipitates is crystallised from alcohol and then from tetrachlorethane. 3-(2' - hydroxy-3'.5'-dimethyl benzyl)-4-hydroxycoumarin melts at 252.5–253°.

*Example 9*

16 parts of 4-hydroxycoumarin and 20 parts of benzhydryl chloride in 100 parts by volume of tetrachlorethane are boiled under reflux for about 15 hours. After cooling, the reaction product is filtered off under suction and crystallised from diluted methanol. The 3-benzydryl-4-hydroxycoumarin obtained melts at 183–184°.

The same compound can be obtained for example according to the processes described in Examples 6 or 7.

*Example 10*

16 parts of 4-hydroxycoumarin and 13 parts of benzyl chloride in 100 parts by volume of tetrachlorethane are boiled under reflux for 24 hours. The solvent is distilled off with steam, the residue is dissolved in diluted caustic soda lye, filtered and acidified. After crystallising from diluted alcohol, the 3-benzyl-4-hydroxy-coumarin melts at 205–207°.

*Example 11*

16 parts of 4-hydroxycoumarin and 20 parts of 4.4'-dichlorodiphenyl-chloromethane in 100 parts by volume of tetrachlorethane are boiled under reflux for 20 hours. After cooling, the reaction product is filtered off under suction and the 3-(4.4'-dichlorodiphenyl)-methyl-4-hydroxycoumarin so obtained is recrystallised from diluted ethanol.

What we claim is:

1. A process for the manufacture of a compound of the formula

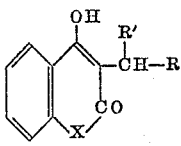

wherein X represents a member selected from the group consisting of O and S, R represents phenyl substituted by a member selected from the group consisting of hydrogen, hydroxy, chloro, methoxy, methyl, hydroxymethyl and tertiary-butyl, and R' represents a member selected from the group consisting of hydrogen, methyl, ethyl, propyl, phenyl and p-chlorophenyl, which comprises heating 1 mol of a compound of the formula

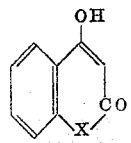

wherein X has the meaning defined above, with 1 mol of a benzyl alcohol of the formula

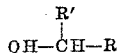

wherein R and R' have the meanings given above, in the presence of a halide selected from the group consisting of hydrogen chloride, hydrogen bromide, phosphorus oxychloride and thionyl chloride and in the presence of an organic solvent selected from the group consisting of tetrachloroethane and chlorobenzene at ordinary pressure to a temperature between 50 and 150° C.

2. A process for the manufacture of the compound of the formula

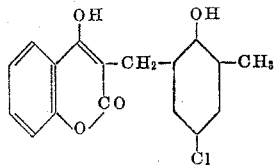

which comprises heating 1 mol of 4-hydroxycoumarin with 1 mol of 2-hydroxy-3-methyl-5-chlorobenzyl alcohol in tetrachloroethane solution in the presence of hydrogen chloride at 135° C.

3. The compound of the formula

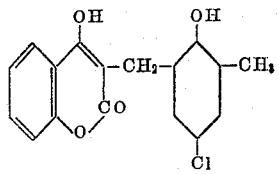

4. A process for the manufacture of the compound of the formula

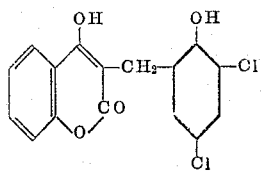

which comprises heating 1 mol of 4-hydroxycoumarin with 1 mol of 2-hydroxy-3.5-dichlorobenzyl alcohol in tetrachloroethane solution in the presence of hydrogen chloride at a temperature between 50 and 150° C.

References Cited in the file of this patent

UNITED STATES PATENTS

| | | |
|---|---|---|
| 2,723,276 | Grussner et al. | Nov. 8, 1955 |
| 2,816,899 | Enders et al. | Dec. 17, 1957 |
| 2,872,457 | Schroeder et al. | Feb. 3, 1959 |
| 2,952,689 | Enders et al. | Sept. 13, 1960 |

FOREIGN PATENTS

| | | |
|---|---|---|
| 734,823 | Great Britain | Aug. 10, 1955 |
| 773,468 | Great Britain | Apr. 24, 1957 |
| 932,373 | Germany | Aug. 29, 1955 |

OTHER REFERENCES

Sullivan et al.: Journal of the American Chemical Society, vol. 65; pages 2285–2291 (pages 2288 and 2289 relied on) (1943).

Fucik et al.: Bulletin de la Societe Chimique de France, 1946; pages 626 to 628 (page 627 relied on).